United States Patent
Matsumoto et al.

(10) Patent No.: US 9,238,734 B2
(45) Date of Patent: *Jan. 19, 2016

(54) ROOM TEMPERATURE AND HUMIDITY THICKENING THERMO-CONDUCTIVE SILICON GREASE COMPOSITION

(75) Inventors: Nobuaki Matsumoto, Annaka (JP); Norio Kameda, Annaka (JP); Mamoru Teshigawara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/123,882

(22) PCT Filed: May 17, 2012

(86) PCT No.: PCT/JP2012/062615
§ 371 (c)(1),
(2), (4) Date: Dec. 4, 2013

(87) PCT Pub. No.: WO2013/018416
PCT Pub. Date: Feb. 7, 2013

(65) Prior Publication Data
US 2014/0094554 A1   Apr. 3, 2014

(30) Foreign Application Priority Data
Jul. 29, 2011  (JP) ................. 2011-166716

(51) Int. Cl.
| | |
|---|---|
| C08G 77/16 | (2006.01) |
| C08G 77/18 | (2006.01) |
| C08L 83/06 | (2006.01) |
| C08K 3/36 | (2006.01) |
| C08G 77/14 | (2006.01) |
| C08G 77/26 | (2006.01) |

(52) U.S. Cl.
CPC . *C08L 83/06* (2013.01); *C08K 3/36* (2013.01); *C08G 77/14* (2013.01); *C08G 77/16* (2013.01); *C08G 77/26* (2013.01)

(58) Field of Classification Search
CPC ........ C08G 77/16; C08G 77/18; C08L 83/04; C08L 83/00; C07F 7/1836; C08K 3/36
USPC .......................................... 529/34
See application file for complete search history.

(56) References Cited

U.S. PATENT DOCUMENTS

| | | | |
|---|---|---|---|
| 6,306,957 B1 * | 10/2001 | Nakano et al. ............ | 524/700 |
| 6,649,258 B2 | 11/2003 | Yamada et al. | |
| 6,818,600 B2 | 11/2004 | Yamada et al. | |
| 7,329,706 B2 | 2/2008 | Fukui et al. | |
| 8,658,754 B2 * | 2/2014 | Matsumoto et al. ........ | 528/34 |
| 2004/0242762 A1 * | 12/2004 | Horikoshi et al. ........ | 524/588 |
| 2004/0254275 A1 * | 12/2004 | Fukui et al. ............ | 524/261 |
| 2006/0079634 A1 | 4/2006 | Horikoshi et al. | |
| 2006/0135687 A1 | 6/2006 | Fukui | |
| 2008/0071023 A1 | 3/2008 | Tabei | |
| 2009/0082428 A1 | 3/2009 | Reddell et al. | |
| 2011/0188213 A1 | 8/2011 | Domae et al. | |
| 2012/0085964 A1 | 4/2012 | Matsumoto et al. | |

FOREIGN PATENT DOCUMENTS

| | | | |
|---|---|---|---|
| CN | 101143930 A | | 3/2008 |
| JP | 61-157569 A | | 7/1986 |
| JP | 62-043492 | * | 2/1987 |
| JP | 8-208993 A | | 8/1996 |
| JP | 2002-327116 A | | 11/2002 |
| JP | 2003-301189 A | | 10/2003 |
| JP | 3543663 B2 | | 7/2004 |
| JP | 2004-262972 A | | 9/2004 |
| JP | 2004-352947 A | | 12/2004 |
| JP | 4255287 B2 | | 4/2009 |

(Continued)

OTHER PUBLICATIONS

JP 62 043492 Partial translation (1987).*
International Search Report issued in PCT/JP2012/062615 mailed Aug. 28, 2012.
Japanese Office Action, dated Aug. 12, 2014, for Japanese Application No. 2011-166716.

(Continued)

*Primary Examiner* — Kuo-Liang Peng
(74) *Attorney, Agent, or Firm* — Birch, Stewart, Kolasch & Birch, LLP

(57) ABSTRACT

Provided is a room temperature and humidity thickening thermo-conductive silicone grease composition with high shape retention characteristics and good workability despite a low viscosity in an initial phase. Essential components of the room temperature and humidity thickening thermo-conductive silicone grease composition of the present invention are: (A) organopolysiloxane with a viscosity of between 0.1 Pa·s and 1,000 Pa·s at 25° C. with both ends being blocked by a hydroxyl group; (B) organopolysiloxane represented by general equation (1)

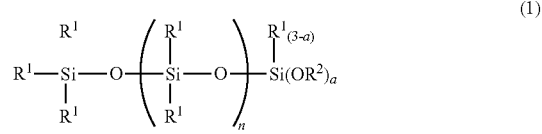

(1)

($R^1$ is independently a substituted or non-substituted monovalent hydrocarbon group, $R^2$ is independently an alkyl group, alkoxy alkyl group, alkenyl group, or acyl group, n is an integer between 2 and 100, and a is an integer between 1 and 3); (C) a silane compound which contains at least three hydrolysable groups bonded to a silicon atom in one molecule and/or a (partial) hydrolyzate or a (partial) hydrolysis condensate thereof; (D) a thickening catalyst; (E) a thermally conductive filler with a thermal conductivity of at least 10 W/m·° C.; and (F) silica fine powder.

9 Claims, No Drawings

(56) References Cited

FOREIGN PATENT DOCUMENTS

| JP | 2009-286855 A | 12/2009 |
| JP | 2012-77256 A | 4/2012 |
| WO | WO 02/092693 A1 | 11/2002 |

OTHER PUBLICATIONS

Search Report dated Jan. 12, 2015 for European Application No. 12820265.2.

* cited by examiner

ROOM TEMPERATURE AND HUMIDITY THICKENING THERMO-CONDUCTIVE SILICON GREASE COMPOSITION

TECHNICAL FIELD

This invention relates to a room temperature and moisture thickening heat-conductive silicone grease composition which is easy to coat and good in shape retention and thus very efficient to work.

BACKGROUND ART

Currently, an ever increasing need for careful management of energy exists in the electric/electronic, transportation and other fields. For more precise energy control, the system is equipped with more than ever electronic components or parts. In the transportation field, for example, a transition takes place from gasoline vehicles to hybrid vehicles, plug-in hybrid vehicles, and electric vehicles. These hybrid and electric vehicles must be loaded with motors, inverters, batteries, and other electronic components or parts which are unnecessary for gasoline vehicles. Also in the body-related mechanisms such as engine control, power train, and air conditioner control mechanisms, control functions become stricter and more control systems are necessary. Accordingly, the number of electronic control units (ECU) is increasing every year. The number of electronic components loaded in such ECU units is also increasing. Nowadays, heat-conductive silicone grease compositions become indispensable to remove heat from these heat-generating electronic components or parts and conduct heat to cooling units in an efficient way.

More than ever electronic components or parts must be mounted within a limited space, indicating that electronic components or parts are kept under widely varying conditions (including temperature, mount angle, etc.). For example, heat-generating electronic components or parts and heatsinks are not held horizontal and accordingly, a heat-conductive material connecting them is often mounted at a certain angle. In such a service environment, a heat-conductive silicone adhesive material, heat-conductive potting material, or RTV heat-conductive silicone rubber composition is used in order to prevent the heat-conductive material from sagging and falling out of the space between the heat-generating component and the heatsink (as disclosed in Patent Documents 1 to 5: JP-A H08-208993, JP-A 561-157569, JP-A 2004-352947, JP 3543663, and JP 4255287). However, since all these heat-conductive materials form a complete bond to members, they undesirably lack re-workability. Since the heat-conductive material becomes very hard after bonding, it cannot withstand repeated stresses induced by thermal strain and separates apart from the heat-generating component, leading to a ramp of thermal resistance. On curing, the heat-conductive material can cause stresses to the electronic component or part.

The above problem can be solved by a one package addition cure heat-conductive silicone composition (as disclosed in Patent Document 6: JP-A 2002-327116). This composition remains re-workable and anti-sagging even after heat curing. In addition, the cured composition which is a relatively soft rubber may play the role of a stress relief agent. Nevertheless, this one package addition cure heat-conductive material suffers from several problems. For example, it must be stored in a refrigerator or freezer and thawed prior to use. In applying the one package addition cure heat-conductive silicone composition, it must be heated and cooled. Then the manufacturing system using the material must be equipped with a heating/cooling oven. The heating and cooling steps take a long time, leading to a reduction of manufacturing efficiency. From the standpoint of energy efficiency, the heating step is not regarded efficient because not only the heat-conductive material, but also overall components must be heated. Additionally, there is a potential risk that if any metal cutting fluid containing an amine compound which is a cure inhibitor is left on the coating surface, the heat-conductive material becomes under-cured.

To mitigate the cumbersome handling of one package addition cure heat-conductive silicone composition including refrigeration/thaw management for storage and heating/cooling steps for application and to obviate any concern about cure inhibition, a one package addition cure heat-conductive material which has been heat crosslinked during preparation is already proposed (Patent Document 7: JP-A 2003-301189). This heat-conductive silicone grease composition has overcome the above-discussed problems, but the tradeoff is that it has too high a viscosity to coat. There are still problems that heavy loading of filler is difficult due to the high viscosity of the base polymer and the manufacture process takes a long time.

To avoid these problems, a heat-conductive silicone composition having a lower viscosity than the above-mentioned one package addition cure heat-conductive silicone compositions and anti-sagging property was developed (Patent Document 8: JP-A 2009-286856). Although the working efficiency is significantly improved, the composition is still unsatisfactory in that the viscosity is too high to automatically carry out the steps of dispensing and screen printing the composition in a short time without mottles.

Developed under the circumstances is a room temperature and moisture-thickening heat-conductive silicone grease composition of dealcoholization type which is storable at room temperature, which has a low viscosity enough to coat at the initial, and which after coating, thickens with moisture at room temperature so that it becomes anti-sagging. Since this silicone grease composition is designed to increase its viscosity (or thicken) with moisture rather than curing with moisture, it is re-workable and applies no substantial stresses to the electronic component. However, the composition was recently found to lack long-term durability, particularly at high temperature. A new room temperature and moisture-thickening heat-conductive silicone grease composition was developed to overcome the outstanding problem. Since this room temperature and moisture-thickening heat-conductive silicone grease composition has a low viscosity at the initial (prior to thickening), its shape retaining capability is so poor that it will sag or deform immediately after coating, leaving a working problem unsolved.

SUMMARY OF INVENTION

Technical Problem

While the invention has been made under the above circumstances, its object is to provide a room temperature and moisture-thickening heat-conductive silicone grease composition which has a high shape retaining capability despite a low viscosity (enough to facilitate coating) at the initial (prior to thickening) and is very efficient to work.

Solution to Problem

Making extensive investigations to attain the above object, the inventors have found that a heat-conductive silicone grease composition adapted to thicken with moisture at room temperature, comprising as essential components, (A) an organopolysiloxane capped at both ends with a hydroxyl group and having a viscosity of 0.1 to 1,000 Pa·s at 25° C., (B) an organopolysiloxane represented by the general formula (1) defined below, (C) a silane compound containing at least three silicon-bonded hydrolysable groups per molecule and/or a (partial) hydrolyzate or (partial) hydrolytic condensate thereof, (D) a thickening catalyst, (E) a heat-conductive filler having a thermal conductivity of at least 10 W/m·° C., and (F) silica fine powder has a high shape retaining capability despite a low viscosity (enough to facilitate coating) at the initial (prior to thickening) and is very efficient to work. The invention is predicated on this finding.

Accordingly, the present invention provides a room temperature and moisture-thickening, heat-conductive silicone grease composition as defined below.

[1] A heat-conductive silicone grease composition adapted to thicken with moisture at room temperature, comprising as essential components, (A) 5 to 80 parts by weight of an organopolysiloxane capped at both ends with a hydroxyl group and having a viscosity of 0.1 to 1,000 Pa·s at 25° C., (B) 20 to 95 parts by weight of an organopolysiloxane represented by the general formula (1):

[Chemical Formula 1]

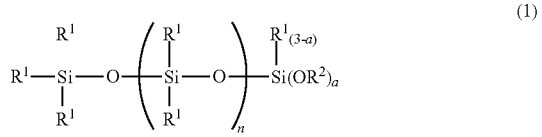
(1)

wherein $R^1$ is independently a substituted or unsubstituted monovalent hydrocarbon group, $R^2$ is independently an alkyl, alkoxyalkyl, alkenyl or acyl group, n is an integer of 2 to 100, and a is an integer of 1 to 3, the sum of components (A) and (B) being 100 parts by weight, (C) 1 to 30 parts by weight of a silane compound containing at least three silicon-bonded hydrolysable groups per molecule and/or a (partial) hydrolyzate or (partial) hydrolytic condensate thereof, (D) 0.01 to 20 parts by weight of a thickening catalyst, (E) 100 to 2,000 parts by weight of a heat conductive filler having a thermal conductivity of at least 10 W/m·° C., and (F) silica fine powder in an amount of 10 to 100 parts by weight per 100 parts by weight of component (A).

[2] The heat-conductive silicone grease composition of [1], further comprising (G) an organosilane represented by the general formula (2) and/or a partial hydrolytic condensate thereof in an amount of 0.1 to 20 parts by weight per 100 parts by weight of components (A) and (B) combined,

(2)

wherein $R^3$ is independently a substituted or unsubstituted alkyl group of 6 to 20 carbon atoms, $R^4$ is independently a substituted or unsubstituted monovalent hydrocarbon group of 1 to 20 carbon atoms, $R^5$ is independently an alkyl group of 1 to 6 carbon atoms, b is an integer of 1 to 3, c is an integer of 0 to 2, and b+c is an integer of 1 to 3.

[3] The heat-conductive silicone grease composition of [1] or [2], further comprising (H) an organopolysilane represented by the average compositional formula (3) and having a viscosity of 0.05 to 1,000 Pa·s at 25° C., in an amount of 10 to 1,000 parts by weight per 100 parts by weight of components (A) and (B) combined,

(3)

wherein $R^6$ is independently a substituted or unsubstituted monovalent hydrocarbon group of 1 to 18 carbon atoms, and d is a positive number of 1.8 to 2.2.

[4] The heat-conductive silicone grease composition of [1], [2] or [3], further comprising (I) a silane compound having a group bonded to a silicon atom via a carbon atom, selected from the class consisting of amino, epoxy, mercapto, acryloyl and methacryloyl, and a silicon-bonded hydrolysable group and/or a partial hydrolytic condensate thereof in an amount of 0.01 to 30 parts by weight per 100 parts by weight of components (A) and (B) combined.

[5] The heat-conductive silicone grease composition of any one of [1] to [4] wherein the silica fine powder as component (F) is surface-treated fumed silica.

[6] The heat-conductive silicone grease composition of any one of [1] to [5] wherein the thickening catalyst as component (D) is a silane or siloxane containing a guanidyl group.

Advantageous Effects of Invention

The room temperature and moisture-thickening, heat-conductive silicone grease composition is very efficient to work since it is easy to coat at the initial (prior to thickening) and yet has a very high shape retaining capability. Since the inventive composition merely thickens without cure unlike adhesive materials, potting materials and room temperature curable heat-conductive silicone rubber compositions, it remains fully repairable even after thickening and eliminates the risk of applying substantial stresses to electronic components. Since the inventive composition has a low viscosity at the initial (prior to thickening) and readily deforms in conformity to protrusions and depressions, it can come in close contact with corners and gaps in a heat-generating component of complex shape. In addition, the inventive composition readily thickens even at room temperature as long as moisture is available, suggesting that it becomes anti-sagging without a need for heating step. Since the inventive composition eliminates a need for refrigeration or freezing during storage and has good heat resistance, it finds use in a wide variety of fields where heat dissipation and heat resistance are required, including electric/electronic and transportation fields.

DESCRIPTION OF EMBODIMENTS

The invention is described below in detail.

Component (A) which is a base polymer of the composition is an organopolysiloxane capped at both ends with hydroxyl groups. The structure of the organopolysiloxane is not particularly limited as long as it is capped with hydroxyl at both ends. It may be any conventional linear organopolysiloxane which cures into an elastomer. Substituent groups which are bonded to silicon atoms include monovalent hydrocarbon groups of 1 to 8 carbon atoms, preferably 1 to 7 carbon atoms, for example, alkyl groups such as methyl, ethyl, propyl, butyl, pentyl, hexyl and heptyl, cycloalkyl groups such as cyclohexyl, alkenyl groups such as vinyl and allyl, and aryl groups such as phenyl and tolyl, and halogenated forms of the foregoing hydrocarbon groups in which some or all hydrogen atoms are substituted by halogen atoms (e.g., chloro, fluoro or bromo), such as chloromethyl, 3-chloropropyl and trifluoromethyl.

Component (A) should have a viscosity at 25° C. of 0.1 to 1,000 Pa·s, preferably 0.3 to 100 Pa·s, and more preferably 0.5 to 50 Pa·s. A viscosity of less than 0.1 Pa·s leads to slow thickening. An organopolysiloxane having a viscosity in excess of 1,000 Pa·s provides a heat-conductive silicone grease composition with too high a viscosity to coat. It is noted that the viscosity is measured by a rotational viscometer (same throughout the disclosure).

Preferably component (A) is an organopolysiloxane having the general formula (4).

[Chemical Formula 2]

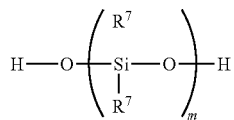
(4)

In formula (4), $R^7$ is each independently a substituted or unsubstituted, monovalent hydrocarbon group of 1 to 8 carbon atoms, preferably 1 to 7 carbon atoms. Suitable monovalent hydrocarbon groups include alkyl groups such as methyl, ethyl, propyl, butyl, pentyl, hexyl and heptyl, aryl groups such as phenyl and tolyl, and halogen or cyano-substituted forms of the foregoing hydrocarbon groups in which some or all hydrogen atoms are substituted by halogen atoms (e.g., chloro, fluoro or bromo) or cyano groups, such as chloromethyl, 3-chloropropyl, trifluoromethyl and cyanoethyl.

The subscript m is such a number that the organopolysiloxane of formula (4) may have a viscosity of 0.1 to 1,000 Pa·s, preferably 0.3 to 100 Pa·s at 25° C.

Component (A) may be used alone or in admixture of two or more.

Component (A) is used in an amount of 5 to 80 parts by weight (pbw), preferably 10 to 70 pbw, provided that components (A) and (B) total to 100 parts by weight (pbw). A composition containing less than 5 pbw of component (A) does not thicken whereas a composition containing more than 80 pbw of component (A) becomes hard rather than flexible after thickening.

Component (B) is an organopolysiloxane represented by the general formula (1) below and preferably having a viscosity of 0.005 to 100 Pa·s at 25° C.

Component (B) plays the important role of maintaining the composition in grease form even after thickening without letting the composition cure to completion.

[Chemical Formula 3]

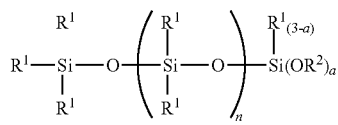
(1)

Herein, $R^1$ is each independently a substituted or unsubstituted monovalent hydrocarbon group, $R^2$ is each independently an alkyl, alkoxyalkyl, alkenyl or acyl group, n is an integer of 2 to 100, and a is an integer of 1 to 3.

In formula (1), $R^1$ is each independently a substituted or unsubstituted monovalent hydrocarbon group, preferably of 1 to 10 carbon atoms, more preferably 1 to 6 carbon atoms, and even more preferably 1 to 3 carbon atoms. Examples include straight, branched and cyclic alkyl, alkenyl, aryl, aralkyl, haloalkyl and cyanoalkyl groups. Suitable straight alkyl groups include methyl, ethyl, propyl, hexyl and octyl. Suitable branched alkyl groups include isopropyl, isobutyl, tert-butyl and 2-ethylhexyl. Suitable cyclic alkyl groups include cyclopentyl and cyclohexyl. Suitable alkenyl groups include vinyl and allyl. Suitable aryl groups include phenyl and tolyl. Suitable aralkyl groups include 2-phenylethyl and 2-methyl-2-phenylethyl. Suitable haloalkyl groups include 3,3,3-trifluoropropyl, 2-(nonafluorobutyl)ethyl, and 2-(heptadecafluorooctyl)ethyl. A typical cyanoalkyl group is cyanoethyl. Preferably $R^1$ is methyl, phenyl or vinyl.

$R^2$ is each independently an alkyl, alkoxyalkyl, alkenyl or acyl group. Suitable alkyl groups include straight, branched and cyclic alkyl groups as exemplified above for $R^1$. Suitable alkoxyalkyl groups include methoxyethyl and methoxypropyl. Suitable acyl groups include acetyl and octanoyl. Preferably $R^2$ is alkyl, and more preferably methyl or ethyl.

The subscript n is an integer of 2 to 100, preferably 5 to 80, and a is an integer of 1 to 3, preferably equal to 3.

Component (B) typically has a viscosity at 25° C. of 0.005 to 100 Pa·s, preferably 0.005 to 50 Pa·s. If the viscosity is less than 0.005 Pa·s, the resulting heat-conductive silicone grease composition is susceptible to oil bleeding and sagging. If the viscosity exceeds 100 Pa·s, the resulting heat-conductive silicone grease composition becomes less flowable and ineffective in coating operation.

Illustrative examples of component (B) are given below.

[Chemical Formula 4]

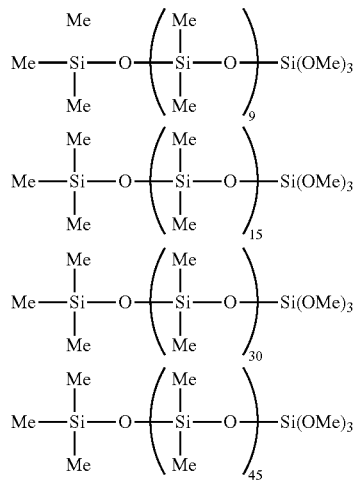

Herein Me stands for methyl.

Component (B) may be used alone or in admixture of two or more.

Component (B) is used in an amount of 20 to 95 pbw, preferably 30 to 90 pbw, provided that the sum of components (A) and (B) is 100 pbw. A composition containing less than 20 pbw of component (B) becomes hard rather than flexible after thickening whereas a composition containing more than 95 pbw of component (B) does not thicken.

Component (C) is a silane compound having at least three hydrolyzable groups bonded to silicon atoms in a molecule, or a (partial) hydrolyzate or (partial) hydrolytic condensate thereof. It serves as a thickener for the composition. The preferred silane compound is represented by the general formula (5).

$$R^8_e SiX_{4-e} \quad (5)$$

In formula (5), $R^8$ is a substituted or unsubstituted monovalent hydrocarbon group of preferably 1 to 10 carbon atoms, more preferably 1 to 6 carbon atoms, examples of which are as illustrated for $R^1$ in formula (1) and $R^7$ in formula (4). Inter alia, $C_1$-$C_3$ alkyl, vinyl and phenyl are preferred.

X is a hydrolyzable group, examples of which include alkoxy, alkoxyalkoxy, alkenyloxy, ketoxime, acyloxy, amino, amide, and aminoxy groups. Suitable alkoxy and alkoxyalkoxy groups may be halo-substituted and include, for example, methoxy, ethoxy, isopropoxy, butoxy, β-chloroethoxy, 2,2,2-trifluoroethoxy, δ-chlorobutoxy, and methoxyethoxy. An exemplary alkenyloxy group is isopropenoxy. Suitable ketoxime groups include, for example, dimethylketoxime, methylethylketoxime and diethylketoxime. Suitable acyloxy groups include, for example, acetoxy and propionyloxy. Suitable amino groups include, for example, dimethylamino, diethylamino, n-butylamino and cyclohexylamino. Suitable amide groups include, for example, N-methylacetamide, N-ethylacetamide, N-butylacetamide and N-cyclohexylacetamide. Suitable aminoxy groups include, for example, N,N-dimethylaminoxy and N,N-diethylaminoxy. More preferably X is an alkenyloxy group.

The subscript e is 0 or 1.

Illustrative examples of the silane compound and the (partial) hydrolyzate or (partial) hydrolytic condensate thereof include alkoxysilanes such as tetramethoxysilane, tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, octadecyltrimethoxysilane, tetra(β-chloroethoxy)silane, tetra(2,2,2-trifluoroethoxy)silane, propyltris(δ-chlorobutoxy)silane, and methyltris(methoxyethoxy)silane; alkoxysiloxanes such as ethyl polysilicate and dimethyltetramethoxydisiloxane; ketoximesilanes such as methyltris(methylethylketoxime)silane, vinyltris(methylethylketoxime)silane, phenyltris(methylethylketoxime)silane, methyltris(diethylketoxime)silane, and tetra(methylethylketoxime)silane; aminosilanes such as methyltris(cyclohexylamino)silane and vinyltris(n-butylamino)silane; amidosilanes such as methyltris(N-methylacetamido)silane, methyltris(N-butylacetamido)silane, and methyltris(N-cyclohexylacetamido)silane; aminoxysilanes such as methyltris(N,N-diethylaminoxy)silane; alkenyloxysilanes such as methyltri(isopropenoxy)silane, vinyltri(isopropenoxy)silane, and phenyltri(isopropenoxy)silane; and acyloxysilanes such as methyltriacetoxysilane and vinyltriacetoxysilane.

Component (C) may be used alone or in admixture of two or more.

Component (C) is used in an amount of 1 to 30 pbw, preferably 1 to 20 pbw, relative to 100 pbw of components (A) and (B) combined. A composition containing less than 1 pbw of component (C) does not thicken whereas a composition containing more than 30 pbw of component (C) is also unlikely to thicken.

Since the room temperature and moisture-thickening heat-conductive silicone grease composition is of condensation thickening type, a thickening or condensation catalyst is used therein as component (D). Suitable catalysts include alkyltin ester compounds such as dibutyltin diacetate, dibutyltin dilaurate and dibutyltin dioctoate; titanic acid esters such as tetraisopropoxytitanium, tetra-n-butoxytitanium, tetrakis(2-ethylhexoxy)titanium, dipropoxybis(acetylacetonato)titanium and titanium isopropoxyoctylene glycol; titanium chelate compounds such as diisopropoxybis(ethyl acetoacetate) titanium, diisopropoxybis(methyl acetoacetate)titanium, diisopropoxybis(acetylacetonate)titanium, dibutoxybis (ethyl acetoacetonate)titanium, and dimethoxybis(ethyl acetoacetonate)titanium; organometallic compounds of zinc, iron, cobalt, manganese or aluminum such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; aminoalkyl-substituted alkoxysilanes such as 3-aminopropyltriethoxysilane and N-(β-aminoethyl)-γ-aminopropyltrimethoxysilane; amine compounds and salts thereof such as hexylamine and dodecylamine phosphate: quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; guanidyl-containing silanes and siloxanes such as tetramethylguanidylpropyltrimethoxysilane, tetramethylguanidylpropylmethyldimethoxysilane and tetramethylguanidylpropyltris(trimethylsiloxy)silane. The catalysts may be used alone or in admixture of two or more. Among others, preferred are guanidyl-containing silanes and siloxanes such as tetramethylguanidylpropyltrimethoxysilane, tetramethylguanidylpropylmethyldimethoxysilane and tetramethylguanidylpropyltris(trimethylsiloxy)silane.

Component (D) is added in an amount of 0.01 to 20 pbw, preferably 0.1 to 5 pbw, relative to 100 pbw of components (A) and (B) combined. A composition containing less than 0.01 pbw of component (D) is unlikely to thicken whereas more than 20 pbw of component (D) is uneconomical.

Component (E) is a heat conductive filler having a thermal conductivity, specifically a filler having a thermal conductivity of at least 10 W/m·° C., preferably at least 15 W/m·° C. If the filler's thermal conductivity is less than 10 W/m·° C., the heat-conductive silicone grease composition also has a low thermal conductivity. Examples of the heat conductive filler include aluminum, copper, silver, nickel, gold, alumina, zinc oxide, magnesium oxide, aluminum nitride, boron nitride, silicon nitride, diamond, and carbon, all in powder form. Any desired filler can be used as long as it has a thermal conductivity of at least 10 W/m·° C. A powder of one type or a mixture of two or more types may be used.

Preferably the heat conductive filler has an average particle size in the range of 0.1 to 300 μm, more preferably 0.1 to 200 μm. With an average particle size of less than 0.1 μm, the composition may lose grease nature and become less spreadable. If the average particle size exceeds 300 μm, the heat-conductive silicone grease composition may lose uniformity. The heat conductive filler may be of any desired shape including irregular and spherical shapes. As used herein, the "average particle size" is a weight average value or median diameter by the laser light diffraction method.

The heat conductive filler is loaded in an amount of 100 to 2,000 pbw, preferably 200 to 1,500 pbw, relative to 100 pbw of components (A) and (B) combined. Less than 100 pbw of the filler fails to provide the desired heat conductivity whereas a composition with more than 2,000 pbw of the filler loses grease nature and becomes less spreadable.

Component (F) is a silica fine powder, which functions to impart shape retention to the composition. The preferred silica fine powder used herein is surface-treated fumed silica. The surface treatment ensures uniform dispersion because silica is made more dispersible in components (A) and (B). Shape retention is achieved by the interaction between surface-treated fumed silica particles and the interaction of surface-treated fumed silica with components (A), (B) and (C).

Useful surface treating agents include chlorosilanes, silazanes and siloxanes. Examples of the surface treating agent include methyltrichlorosilane, dimethyldichlorosilane, trimethylchlorosilane, hexamethyldisilazane, octamethylcyclotetrasiloxane, and α,ω-trimethylsilyldimethylpolysiloxane.

Also preferably, component (F) has a specific surface area of at least 50 m²/g, more preferably at least 100 m²/g (as measured by the BET method). If the surface area is less than 50 m²/g, the heat-conductive silicone grease composition may have too high an initial viscosity and lose working efficiency. Notably, the specific surface area (BET method) is preferably up to 500 m²/g, more preferably up to 300 m²/g because a higher shape retaining capability is available in the range.

Component (F) is added in an amount of 10 to 100 pbw, preferably 10 to 50 pbw, and more preferably 10.1 to 45 pbw relative to 100 pbw of component (A). A composition containing less than 10 pbw of component (F) is not shape retainable whereas a composition containing more than 100 pbw of component (F) loses grease nature and becomes less spreadable.

To the room temperature and moisture-thickening, heat-conductive silicone grease composition of the invention, (G) an organosilane having the general formula (2) and/or a partial hydrolytic condensate thereof may be compounded, which is effective for further reducing the viscosity of the composition.

$$R^3_b R^4_c Si(OR^5)_{4-b-c} \quad (2)$$

Herein $R^3$ is independently an unsubstituted $C_6$-$C_{20}$ alkyl group, $R^4$ is independently a substituted or unsubstituted, $C_1$-$C_{20}$ monovalent hydrocarbon group, $R^5$ is independently a $C_1$-$C_6$ alkyl group, b is an integer of 1 to 3, c is an integer of 0 to 2, and b+c is an integer of 1 to 3.

In formula (2), $R^3$ is independently a substituted or unsubstituted $C_6$-$C_{20}$ alkyl group. Exemplary groups include alkyl groups such as hexyl, octyl, decyl, dodecyl, tetradecyl, hexadecyl, and octadecyl and haloalkyl groups in which some or all hydrogen atoms are substituted by halogen atoms (e.g. chloro, fluoro and bromo) such as 2-(perfluorobutyl)ethyl and 2-(perfluorooctyl)ethyl. Of these, $C_6$-$C_{14}$ alkyl groups are preferred.

$R^4$ is independently a substituted or unsubstituted, monovalent hydrocarbon group of 1 to 20 carbon atoms, preferably 1 to 10 carbon atoms. Suitable monovalent hydrocarbon groups include alkyl groups such as methyl, ethyl, propyl, hexyl, octyl, decyl, dodecyl, tetradecyl, hexadecyl, and octadecyl, cycloalkyl groups such as cyclopentyl and cyclohexyl, alkenyl groups such as vinyl and allyl, aryl groups such as phenyl and tolyl, aralkyl groups such as 2-phenylethyl and 2-methyl-2-phenylethyl, and halogenated forms of the foregoing hydrocarbon groups in which some or all hydrogen atoms are substituted by halogen atoms (e.g., chloro, fluoro or bromo), such as 3,3,3-trifluoropropyl, 2-(perfluorobutyl)ethyl, 2-(perfluorooctyl)ethyl and p-chlorophenyl. Inter alia, methyl is preferred.

$R^5$ is a $C_1$-$C_6$ alkyl group, such as methyl, ethyl, propyl, butyl, pentyl or hexyl, or a mixture thereof. Inter alia, methyl and ethyl are preferred.

The subscript b is an integer of 1 to 3, c is an integer of 0 to 2, and b+c is equal to 1, 2 or 3, preferably 1.

Preferred examples of component (G) include $C_{10}H_{21}Si(OCH_3)_3$, $C_{10}H_{21}Si(OCH_2CH_3)_3$, $C_{14}H_{29}Si(OCH_3)_3$, and $C_{14}H_{29}Si(OCH_2CH_3)_3$.

Component (G) may be used alone or in admixture of two or more.

The organosilane and/or partial hydrolytic condensate thereof as component (G) is preferably used in an amount of 0.1 to 20 pbw, more preferably 0.2 to 15 pbw, relative to 100 pbw of components (A) and (B) combined. Less than 0.1 pbw of component (G) may be less effective for reducing the viscosity of the composition whereas more than 20 pbw of component (G) may achieve no further effects and be uneconomical.

To the heat-conductive silicone grease composition, (H) an organopolysiloxane represented by the following average compositional formula (3) and having a viscosity of 0.05 to 1,000 Pa·s at 25° C. may be compounded. It is preferably a linear organopolysiloxane end-capped with a triorganosiloxy group, typically trialkylsiloxy, and is effective for adjusting the initial viscosity of the composition.

$$R^6_d SiO_{(4-d)/2} \quad (3)$$

Herein $R^6$ is independently a substituted or unsubstituted, $C_1$-$C_{18}$ monovalent hydrocarbon group, and d is a positive number of 1.8 to 2.2.

In formula (3), $R^6$ is a substituted or unsubstituted, $C_1$-$C_{18}$ monovalent hydrocarbon group, examples of which include alkyl groups such as methyl, ethyl, propyl, pentyl, hexyl, heptyl, octyl, nonyl, decyl, dodecyl, tetradecyl, hexadecyl and octadecyl, cycloalkyl groups such as cyclopentyl and cyclohexyl, alkenyl groups such as vinyl and allyl, aryl groups such as phenyl and tolyl, aralkyl groups such as 2-phenylethyl and 2-methyl-2-phenylethyl, and halogenated forms of the foregoing hydrocarbon groups in which some or all hydrogen atoms are substituted by halogen atoms (e.g., chloro, fluoro or bromo), such as 3,3,3-trifluoropropyl, 2-(perfluorobutyl)ethyl, 2-(perfluorooctyl)ethyl and p-chlorophenyl. Inter alia, methyl, phenyl and $C_6$-$C_{14}$ alkyl groups are preferred.

The subscript d is a positive number in the range of 1.8 to 2.2, preferably 1.9 to 2.2, when the desired viscosity of the heat-conductive silicone grease composition is considered.

The organopolysiloxane as component (H) should preferably have a viscosity at 25° C. of 0.05 to 1,000 Pa·s, more preferably 0.5 to 100 Pa·s. If the organopolysiloxane has a viscosity of less than 0.05 Pa·s, the resulting heat-conductive silicone grease composition may be susceptible to oil bleeding. If the viscosity exceeds 1,000 Pa·s, the resulting heat-conductive silicone grease composition may become ineffective in coating operation.

Illustrative examples of component (H) are given below.

[Chemical Formula 5]

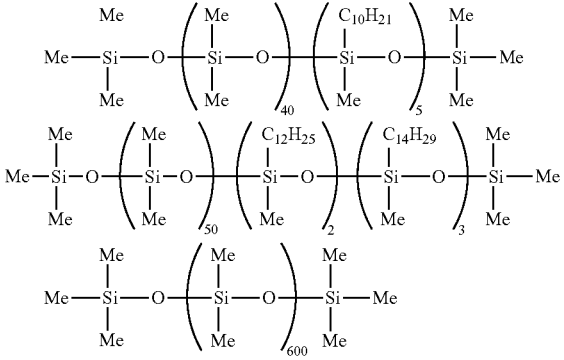

Herein Me stands for methyl.

Component (H) may be used alone or in admixture of two or more.

Component (H) is preferably used in an amount of 10 to 1,000 pbw, more preferably 20 to 500 pbw, relative to 100 pbw of components (A) and (B) combined. Less than 10 pbw of component (H) may achieve less a diluting effect whereas a silicone grease composition containing more than 1,000 pbw of component (H) may not readily increase its viscosity with moisture.

The heat-conductive silicone grease composition may further comprise (I) a silane compound having a functional group bonded to a silicon atom via a carbon atom and selected from the class consisting of amino, epoxy, mercapto, acryloyl, and methacryloyl, and a hydrolyzable group bonded to a silicon atom and/or a partial hydrolytic condensate thereof. Component (I) has the function of enhancing the adhesion between the composition and a substrate surface which is coated therewith.

When the silane compound or partial hydrolytic condensate thereof has two or more functional groups, they may be bonded to a silicon atom either via different carbon atoms or via a common carbon atom. Preferably the silane compound or partial hydrolytic condensate thereof has one to three hydrolyzable groups, more preferably two or three hydrolyzable groups. Examples of the hydrolyzable group are as illustrated for X in formula (5) as component (C), with alkoxy being preferred.

Examples of the silane compound include amino-containing silanes such as 3-aminopropyldimethoxymethylsilane, 3-aminopropyltrimethoxysilane, 3-aminopropyltriethoxysilane, 3-(2-aminoethylamino)propyldimethoxymethylsilane, 3-(2-aminoethylamino)propyltrimethoxysilane, 2-aminoethylaminomethyldimethoxymethylsilane, and 2-aminoethylaminomethyltrimethoxysilane; mercapto-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy-containing silanes such as 3-glycidoxypropyltrimethoxysilane, 3-glycidoxypropyldimethoxymethylsilane, 3-glycidoxyethyltrimethoxysilane, and 3-glycidoxyethyldimethoxymethylsilane; and (meth)acryloyl-containing silanes such as methacryloxypropyltrimethoxysilane, methacryloxypropyltriethoxysilane, methacryloxypropylmethyldimethoxysilane, acryloxypropyltrimethoxysilane, and acryloxypropyltriethoxysilane.

Component (I) is not limited to one, and a mixture of two or more silane compounds may be used.

Component (I) is preferably compounded in an amount of 0.01 to 30 pbw, more preferably 0.1 to 20 pbw, relative to 100 pbw of components (A) and (B) combined. Less than 0.01 pbw of component (I) may be less effective for enhancing adhesion whereas more than 30 pbw of component (I) may achieve no further adhesion enhancing effects and be uneconomical.

Besides the foregoing components, any well-known additives may be added to the heat-conductive silicone grease composition as long as the objects of the invention are not compromised. Suitable additives include reinforcing and non-reinforcing fillers such as calcium carbonate, and thixotropic agents such as polyethers. If necessary, colorants such as pigments and dyes may be added.

The room temperature and moisture-thickening, heat-conductive silicone grease composition of the invention may be prepared by mixing the foregoing components on any well-known means until uniform. The composition thus obtained should preferably have an initial viscosity at 25° C. of 10 to 300 Pa·s, more preferably 50 to 250 Pa·s.

Since the heat-conductive silicone grease composition has a low viscosity at the initial (prior to thickening) and readily deforms in conformity to protrusions and depressions, it can come in close contact with corners and gaps in a heat-generating component of complex shape.

The heat-conductive silicone grease composition is distinguished from adhesive materials, potting materials and room temperature curable heat-conductive silicone rubber compositions in that it merely thickens without curing. As long as moisture is available, the composition thickens even at room temperature, eliminating a heating step. Once the composition has thickened, it is not prone to sag down even in an upright posture. The composition may be stored without a need for refrigeration or freezing.

After the heat-conductive silicone grease composition is held at a temperature of 23±2° C. and a relative humidity (RH) of 50±5% for 7 days (i.e., after thickening with moisture), it preferably has a viscosity at 25° C. of 500 to 2,000 Pa·s, more preferably 700 to 1,900 Pa·s.

The heat-conductive silicone grease composition that merely thickens with moisture rather than curing has several advantages. When applied as heat-dissipating grease to an electronic part, the composition sags little, remains fully repairable and is unlikely to apply substantial stresses to the electronic part. Because of good heat resistance, the composition is useful in a wide variety of heat-dissipating and heat-resisting applications such as electric/electronic and transportation fields.

EXAMPLES

Examples and Comparative Examples are given below by way of illustration and not by way of limitation. Examples are included for the purpose of demonstrating advantages of the invention. In the formulae, Me stands for methyl.

First the following components were prepared.

Component A
A-1: dimethylpolysiloxane capped with hydroxyl at both ends and having a viscosity of 5 Pa·s at 25° C.
A-2: dimethylpolysiloxane capped with hydroxyl at both ends and having a viscosity of 20 Pa·s at 25° C.
A-3 (comparison): dimethylpolysiloxane capped with hydroxyl at both ends and having a viscosity of 0.08 Pa·s at 25° C.
A-4 (comparison): dimethylpolysiloxane capped with hydroxyl at both ends and having a viscosity of 1,100 Pa·s at 25° C.

Component B
B-1: organopolysiloxane of the following formula.

[Chemical Formula 6]

$$Me-\underset{\underset{Me}{|}}{\overset{\overset{Me}{|}}{Si}}-O-\left(\underset{\underset{Me}{|}}{\overset{\overset{Me}{|}}{Si}}-O\right)_{30}-Si(OMe)_3$$

Component C
C-1: phenyltri(isopropenoxy)silane
C-2: vinyltri(isopropenoxy)silane
Component D
D-1: tetramethylguanidylpropyltrimethoxysilane
Component E Powders E-1 and E-2 were prepared by milling the following heat-conductive fillers in a mixing ratio shown in Table 1 for 15 minutes at room temperature on a 5-L gate mixer (5-L Planetary Mixer by Inoue Mfg. Co., Ltd.). E-3 consisted of zinc oxide powder.
  alumina powder with an average particle size of 10 μm and a thermal conductivity of 27 W/m·° C.

aluminum powder with an average particle size of 15 μm and a thermal conductivity of 236 W/m·° C.
zinc oxide powder with an average particle size of 1.0 μm and a thermal conductivity of 25 W/m·° C.

TABLE 1

| Component E | Alumina powder with average particle size 10 μm, g | Aluminum powder with average particle size 15.0 μm, g | Zinc oxide powder with average particle size 1.0 μm, g |
|---|---|---|---|
| E-1 | 1,500 | 0 | 400 |
| E-2 | 0 | 1,500 | 400 |
| E-3 | 0 | 0 | 400 |

Component F
F-1: dry fumed silica having a BET specific surface area of 120 m²/g and treated with dimethyldichlorosilane to be hydrophobic
Component G
G-1: organosilane of $C_{10}H_{21}Si(OCH_3)_3$
Component H
H-1: organopolysiloxane of the following formula having a viscosity of 5 Pa·s at 25° C.

[Chemical Formula 7]

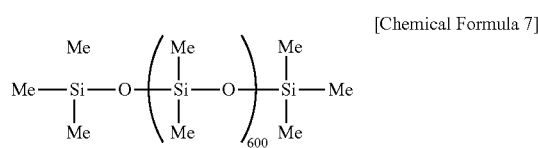

Component I, Amino-Containing Silane
I-1: 3-aminopropyltriethoxysilane

Examples 1 to 5 and Comparative Examples 1 to 6

Compositions of Examples 1 to 5 and Comparative Examples 1 to 6 were prepared by mixing components (A) to (I) in the amounts shown in Tables 2 and 3. Specifically, a 5-L gate mixer (5-L Planetary Mixer by Inoue Mfg. Co., Ltd.) was charged with the predetermined amounts (in Tables 2 and 3) of components (A), (B) and (E), followed by heat agitation at 150° C. for 3 hours while deaerating. The mixture was then cooled to room temperature, to which components (C), (D) and (F) were added. The mixture was agitated at room temperature until uniform while deaerating. If necessary, component (G), (H) or (I) was added, and the mixture was agitated at room temperature until uniform while deaerating. The resulting composition was measured for viscosity, thermal conductivity, and shape retention by the test methods shown below. The results are also shown in Tables 2 and 3.

Evaluation of Initial Viscosity
The initial viscosity of a heat-conductive silicone grease composition was measured at 25° C. by a viscometer PC-10AA (Malcom Co., Ltd.).

Evaluation of Viscosity After Thickening
A heat-conductive silicone grease composition was shaped in a sheet form of 3.0 mm thick and allowed to stand at 23±2° C. and 50±5% RH for 7 days before a viscosity was measured at 25° C. by a viscometer PC-10AA (Malcom).

Evaluation of Thermal Conductivity
The thermal conductivity of a heat-conductive silicone grease composition prior to thickening was measured at 23° C. by a hot disc method thermal properties analyzer TPA-501 (Kyoto Electronics Mfg. Co., Ltd.).

Evaluation of Shape Retention
In a 23±2° C./50±5% RH environment, 0.5 mL of a heat-conductive silicone grease composition was coated onto an aluminum plate as a circular coating (diameter ~1 cm). Immediately after coating, the aluminum plate was held upright. The distance (mm) over which the heat-conductive silicone grease composition moved down was measured as an index of shape retention. A shorter moving distance indicates better shape retention.

TABLE 2

| Formulation (pbw) | | Example 1 | Example 2 | Example 3 | Example 4 | Example 5 |
|---|---|---|---|---|---|---|
| Component A | A-1 | 40 | 50 | 30 | 30 | 0 |
|  | A-2 | 0 | 0 | 0 | 0 | 40 |
|  | A-3 | 0 | 0 | 0 | 0 | 0 |
|  | A-4 | 0 | 0 | 0 | 0 | 0 |
| Component B | B-1 | 60 | 50 | 70 | 70 | 60 |
| Component C | C-1 | 7 | 0 | 7 | 1 | 10 |
|  | C-2 | 0 | 7 | 0 | 0 | 0 |
| Component D | D-1 | 1 | 1 | 1 | 0.25 | 2 |
| Component E | E-1 | 1,000 | 1,000 | 0 | 0 | 500 |
|  | E-2 | 0 | 0 | 1,400 | 0 | 0 |
|  | E-3 | 0 | 0 | 0 | 350 | 0 |
| Component F | F-1 | 5 | 6 | 4 | 6 | 7 |
| Component G | G-1 | 0 | 0 | 2 | 0 | 0 |
| Component H | H-1 | 0 | 0 | 0 | 0 | 20 |
| Component I | I-1 | 0 | 0 | 0 | 1 | 0 |
| Test results | | | | | | |
| Initial viscosity (Pa·s) | | 85 | 150 | 130 | 130 | 200 |
| Viscosity after thickening (Pa·s) | | 1,460 | 1,500 | 700 | 1,100 | 1,400 |
| Thermal conductivity (W/m·° C.) | | 2.4 | 2.3 | 4.6 | 1.1 | 1.1 |
| Shape retention (mm) | | 0 | 0 | 0 | 0 | 0 |

TABLE 3

| Formulation (pbw) | | Comparative Example 1 | Comparative Example 2 | Comparative Example 3 | Comparative Example 4 | Comparative Example 5 | Comparative Example 6 |
|---|---|---|---|---|---|---|---|
| Component A | A-1 | 0 | 90 | 0 | 0 | 40 | 40 |
|  | A-2 | 2 | 0 | 0 | 0 | 0 | 0 |
|  | A-3 | 0 | 0 | 40 | 0 | 0 | 0 |
|  | A-4 | 0 | 0 | 0 | 10 | 0 | 0 |
| Component B | B-1 | 98 | 10 | 60 | 90 | 60 | 60 |
| Component C | C-1 | 7 | 7 | 10 | 10 | 7 | 7 |
|  | C-2 | 0 | 0 | 0 | 0 | 0 | 0 |
| Component D | D-1 | 1 | 1 | 3 | 0 | 1 | 1 |

TABLE 3-continued

| | | Comparative Example | | | | | |
|---|---|---|---|---|---|---|---|
| Formulation (pbw) | | 1 | 2 | 3 | 4 | 5 | 6 |
| Component E | E-1 | 1,000 | 1,000 | 1,000 | 800 | 1,000 | 1,000 |
| | E-2 | 0 | 0 | 0 | 0 | 0 | 0 |
| | E-3 | 0 | 0 | 0 | 0 | 0 | 0 |
| Component F | F-1 | 2 | 10 | 6 | 5 | 0 | 50 |
| Component G | G-1 | 0 | 0 | 0 | 0 | 0 | 0 |
| Component H | H-1 | 0 | 0 | 0 | 0 | 0 | 0 |
| Component I | I-1 | 0 | 0 | 0 | 0 | 0 | 0 |
| | | Test results | | | | | |
| Initial viscosity (Pa·s) | | 30 | 230 | 100 | not greasy | 50 | not greasy |
| Viscosity after thickening (Pa·s) | | not thickened | cured (immeasurable) | not thickened | not measured | 800 | not measured |
| Thermal conductivity (W/m·°C.) | | 2.0 | 2.3 | 2.2 | 1.5 | 2.1 | 2.3 |
| Shape retention (mm) | | 40 | 0 | 0 | not measured | 25 | not measured |

The invention claimed is:

1. A heat-conductive silicone grease composition adapted to thicken with moisture at room temperature, comprising as essential components, (A) 5 to 50 parts by weight of an organopolysiloxane capped at both ends with a hydroxyl group and having a viscosity of 0.1 to 1,000 Pa·s at 25° C., (B) 50 to 95 parts by weight of an organopolysiloxane represented by the general formula (1):

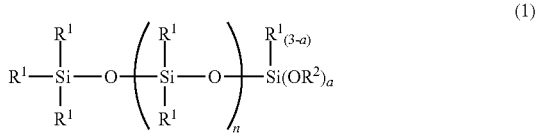

wherein
  $R^1$ is independently a substituted or unsubstituted monovalent hydrocarbon group,
  $R^2$ is independently an alkyl, alkoxyalkyl, alkenyl or acyl group,
  n is an integer of 2 to 80, and
  a is an integer of 1 to 3,
    the sum of components (A) and (B) being 100 parts by weight, (C) 1 to 30 parts by weight of a silane compound containing at least three silicon-bonded hydrolysable groups per molecule and/or a (partial) hydrolyzate or (partial) hydrolytic condensate thereof, (D) 0.01 to 20 parts by weight of a thickening catalyst in the form of a silane or siloxane containing a guanidyl group, (E) 100 to 2,000 parts by weight of a heat conductive filler having a thermal conductivity of at least 10 W/m·°C., and (F) silica fine powder in an amount of 10 to 100 parts by weight per 100 parts by weight of component (A).

2. The heat-conductive silicone grease composition of claim 1, further comprising (G) an organosilane represented by the general formula (2) and/or a partial hydrolytic condensate thereof in an amount of 0.1 to 20 parts by weight per 100 parts by weight of components (A) and (B) combined,

wherein $R^3$ is independently a substituted or unsubstituted alkyl group of 6 to 20 carbon atoms, $R^4$ is independently a substituted or unsubstituted monovalent hydrocarbon group of 1 to 20 carbon atoms, $R^5$ is independently an alkyl group of 1 to 6 carbon atoms, b is an integer of 1 to 3, c is an integer of 0 to 2, and b+c is an integer of 1 to 3.

3. The heat-conductive silicone grease composition of claim 1, further comprising (H) an organopolysiloxane represented by the average compositional formula (3) and having a viscosity of 0.05 to 1,000 Pa·s at 25° C., in an amount of 10 to 1,000 parts by weight per 100 parts by weight of components (A) and (B) combined,

wherein $R^6$ is independently a substituted or unsubstituted monovalent hydrocarbon group of 1 to 18 carbon atoms, and d is a positive number of 1.8 to 2.2.

4. The heat-conductive silicone grease composition of claim 1 or 2, further comprising (I) a silane compound having a group bonded to a silicon atom via a carbon atom, selected from the class consisting of amino, epoxy, mercapto, acryloyl and methacryloyl, and a silicon-bonded hydrolysable group and/or a partial hydrolytic condensate thereof in an amount of 0.01 to 30 parts by weight per 100 parts by weight of components (A) and (B) combined.

5. The heat-conductive silicone grease composition of claim 1 or 2 wherein the silica fine powder as component (F) is surface-treated fumed silica.

6. The heat-conductive silicone grease composition of claim 1, wherein the organopolysiloxane of component (A) has the following general formula (4):

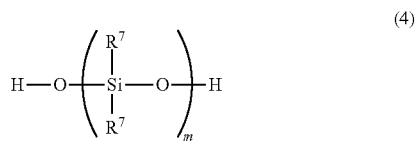

wherein $R^7$ is each independently a substituted or unsubstituted, monovalent hydrocarbon group of 1 to 8 carbon atoms, and the subscript m is such a number that the organopolysiloxane of formula (4) has a viscosity of 0.1 to 1,000 Pa·s.

7. The heat-conductive silicone grease composition of claim 1, wherein the silane compound of component (C) has the following general formula (5):

$$R^8_e SiX_{4-e} \quad (5)$$

wherein $R^8$ is a substituted or unsubstituted monovalent hydrocarbon group of 1 to 10 carbon atoms, X is a hydrolyzable group, and the subscript e is 0 or 1.

8. A heat-conductive silicone grease composition adapted to thicken with moisture at room temperature, consisting of
   (A) 5 to 50 parts by weight of an organopolysiloxane capped at both ends with a hydroxyl group and having a viscosity of 0.1 to 1,000 Pa·s at 25° C.,
   (B) 50 to 95 parts by weight of an organopolysiloxane represented by the general formula (1):

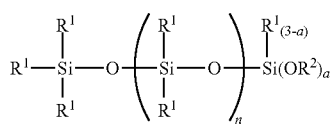

wherein $R^1$ is independently a substituted or unsubstituted monovalent hydrocarbon group, $R^2$ is independently an alkyl, alkoxyalkyl, alkenyl or acyl group, n is an integer of 2 to 80, and a is an integer of 1 to 3, the sum of components (A) and (B) being 100 parts by weight,
   (C) 1 to 30 parts by weight of a silane compound containing at least three silicon-bonded hydrolysable groups per molecule and/or a (partial) hydrolyzate or (partial) hydrolytic condensate thereof,
   (D) 0.01 to 20 parts by weight of a thickening catalyst,
   (E) 100 to 2,000 parts by weight of a heat conductive filler having a thermal conductivity of at least 10 W/m·° C., and
   (F) silica fine powder in an amount of 10 to 100 parts by weight per 100 parts by weight of component (A).

9. A heat-conductive silicone grease composition adapted to thicken with moisture at room temperature, consisting of
   (A) 5 to 50 parts by weight of an organopolysiloxane capped at both ends with a hydroxyl group and having a viscosity of 0.1 to 1,000 Pa·s at 25° C.,
   (B) 50 to 95 parts by weight of an organopolysiloxane represented by the general formula (1):

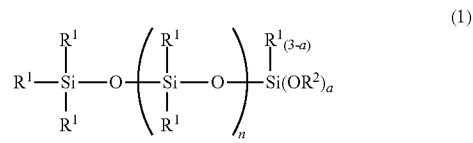

wherein $R^1$ is independently a substituted or unsubstituted monovalent hydrocarbon group, $R^2$ is independently an alkyl, alkoxyalkyl, alkenyl or acyl group, n is an integer of 2 to 80, and a is an integer of 1 to 3, the sum of components (A) and (B) being 100 parts by weight,
   (C) 1 to 30 parts by weight of a silane compound containing at least three silicon-bonded hydrolysable groups per molecule and/or a (partial) hydrolyzate or (partial) hydrolytic condensate thereof,
   (D) 0.01 to 20 parts by weight of a thickening catalyst,
   (E) 100 to 2,000 parts by weight of a heat conductive filler having a thermal conductivity of at least 10 W/m·° C.,
   (F) silica fine powder in an amount of 10 to 100 parts by weight per 100 parts by weight of component (A), and
   any one or more of the following components (G) to (I):
   (G) an organosilane represented by the general formula (2) and/or a partial hydrolytic condensate thereof in an amount of 0.1 to 20 parts by weight per 100 parts by weight of components (A) and (B) combined $$R^3_b R^4_c Si(OR^5)_{4-b-c} \quad (2)$$

wherein $R^3$ is independently a substituted or unsubstituted alkyl group of 6 to 20 carbon atoms, $R^4$ is independently a substituted or unsubstituted monovalent hydrocarbon group of 1 to 20 carbon atoms, $R^5$ is independently an alkyl group of 1 to 6 carbon atoms, b is an integer of 1 to 3, c is an integer of 0 to 2, and b+c is an integer of 1 to 3,
   (H) an organopolysiloxane represented by the average compositional formula (3) and having a viscosity of 0.05 to 1,000 Pa·s at 25° C., in an amount of 10 to 1,000 parts by weight per 100 parts by weight of components (A) and (B) combined $$R^6_d SiO_{(4-d)/2} \quad (3)$$

wherein $R^6$ is independently a substituted or unsubstituted monovalent hydrocarbon group of 1 to 18 carbon atoms, and d is a positive number of 1.8 to 2.2, and
   (I) a silane compound having a group bonded to a silicon atom via a carbon atom, selected from the class consisting of amino, epoxy, mercapto, acryloyl and methacryloyl, and a silicon-bonded hydrolysable group and/or a partial hydrolytic condensate thereof in an amount of 0.01 to 30 parts by weight per 100 parts by weight of components (A) and (B) combined.

* * * * *